Feb. 11, 1930.  A. B. EDWARDS  1,746,995
AUTOMATIC HOSE WINDER
Filed April 7, 1927   3 Sheets-Sheet 1

Inventor
Alrah B Edwards
By Wm O Belt Atty

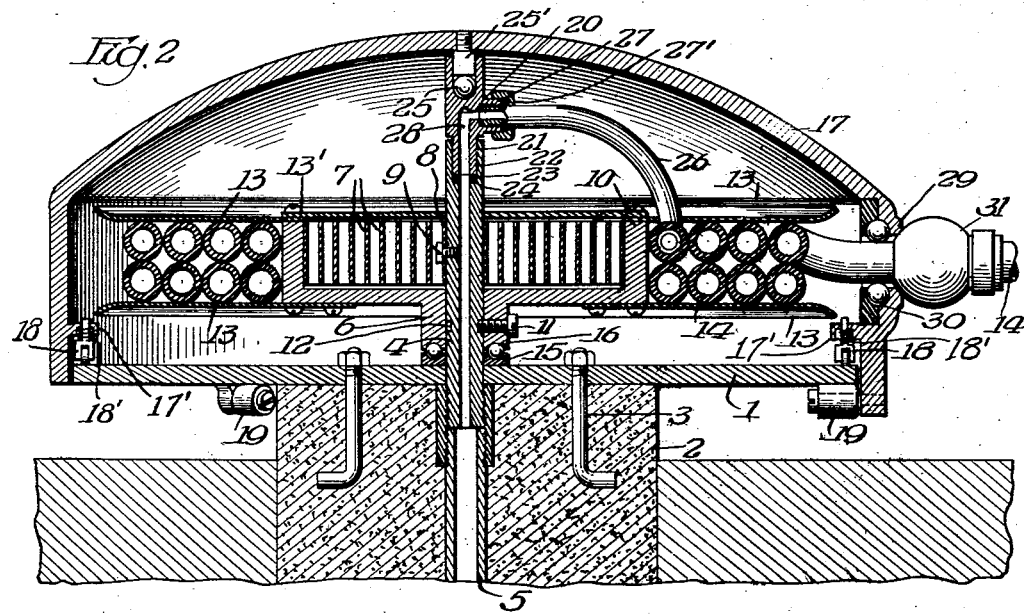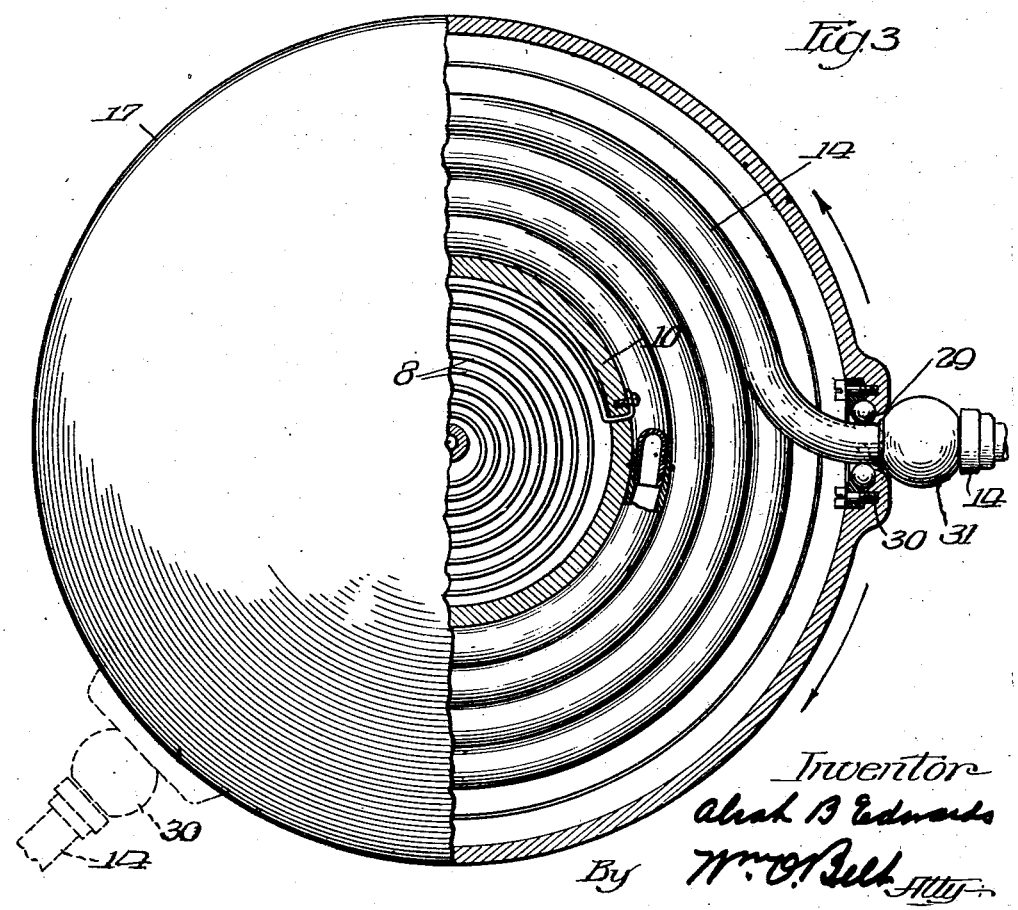

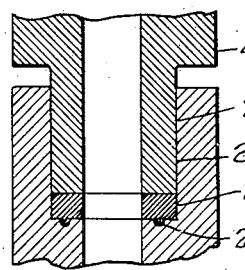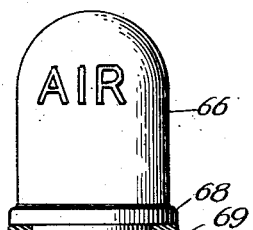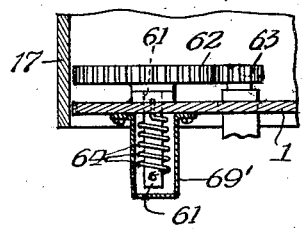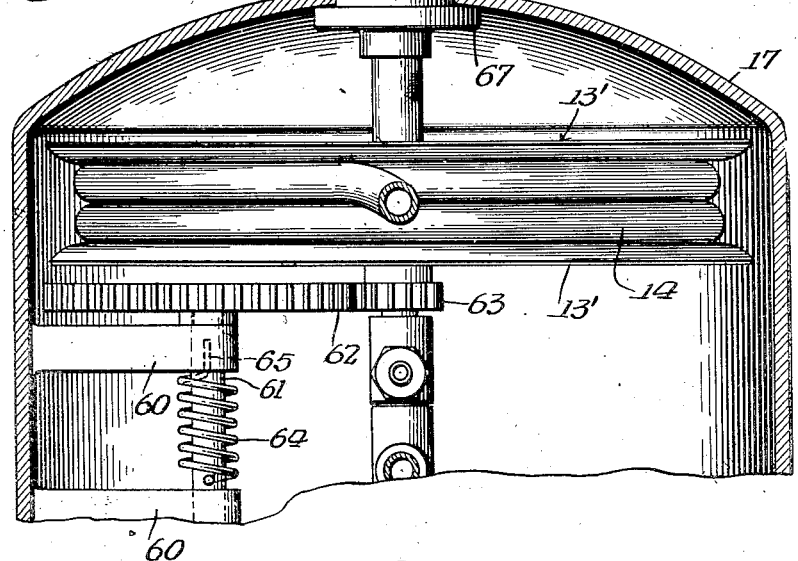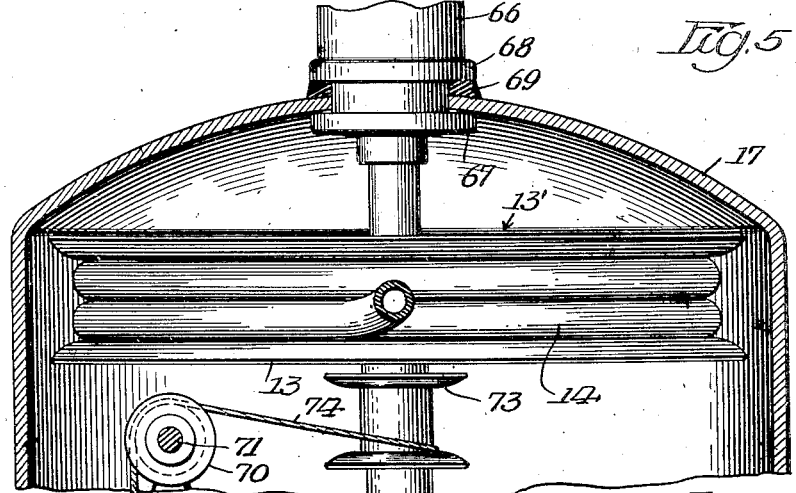

Patented Feb. 11, 1930

1,746,995

UNITED STATES PATENT OFFICE

ALRAH B. EDWARDS, OF ABILENE, TEXAS

AUTOMATIC HOSE WINDER

Application filed April 7, 1927. Serial No. 181,656.

This invention relates to an automatic hose winder.

It more particularly relates to an automatic hose winder arranged in a suitable casing for use in automobile filling stations, garages, service stations, and the like where air and water is provided, but it is also adapted for use in car washing stations or in factories where air is used for operating pneumatic tools and in many other places too numerous to mention.

Heretofore the air has been furnished to motor vehicles by means of a vertical upright having a long rubber hose attached thereto which when not in use has been coiled around a pin or other support and the water has been furnished by a vertical riser having a rubber hose connection thereto of sufficient length to reach an automobile radiator. In practice the hose is hard to handle and it is pulled around at all angles and constantly exposed to the weather so that it becomes dirty and kinks and rots causing leaks and requiring repairs, and often hangs or lies in the path of traffic.

In the present invention these disadvantages are entirely eliminated by providing new, novel, and useful means for winding and housing the hose.

The object of this invention is to provide an automatic hose winding machine, suitably encased, which will revolve 360 degrees and which will always keep the hose coiled within its casing and which will wind the hose automatically within the casing when not in use.

Another object thereof is to provide a hose winding machine which is compact, which is simple in construction, which can be readily and economically manufactured, and which operates smoothly and gently and is positive in operation.

Another object thereof is to provide a combined water and air service mounted within a single casing and which is provided with independent winders for both the water and air hose, or two of either.

Other objects and advantages will hereinafter appear.

In the drawings forming a part of this specification.

Fig. 2 is a vertical section of the hose winding machine which is adapted for either air or water.

Fig. 3 is a top plan view of the winding machine.

Fig. 4 is a modified form of the hose winding machine showing gears operated by a helical spring for winding the hose in the racks.

Fig. 5 is another modified form of the hose winder in which the winding means is operated by weights.

Fig. 6 is a detail view of the pipe connections which provides a tight seal for preventing the escape of air or water therethrough.

Fig. 7 is a detail view of a modified form of the helical spring winding mechanism.

Like numerals designate like parts throughout the entire application.

Figure 1:
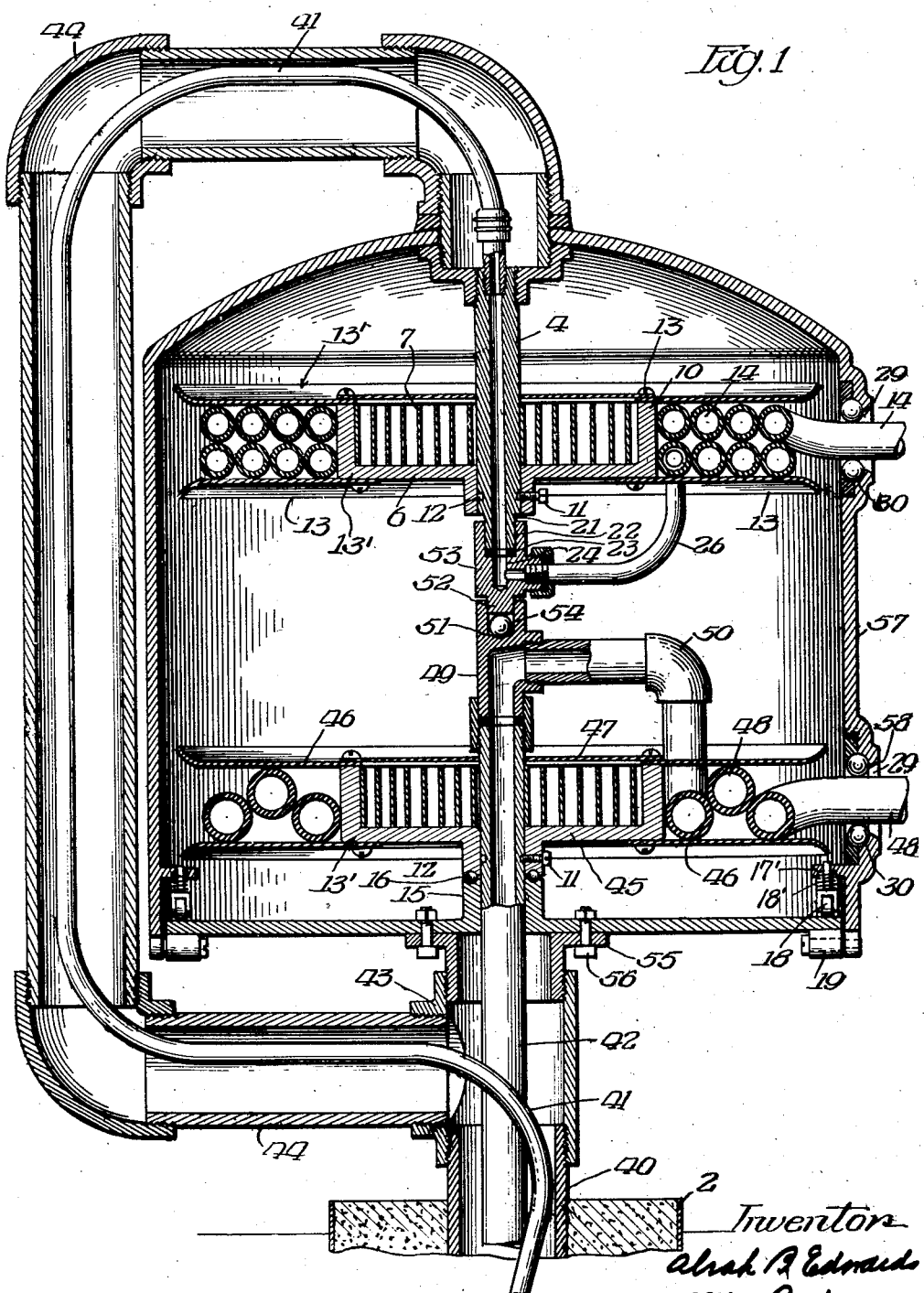
Fig. 1 is a vertical section of the automatic hose winding machine having both air and water service.

Referring to the drawings and particularly to Fig. 2 thereof, 1 designates a plate rigidly mounted on a suitable base 2 by means of suitable anchors 3. The plate has an opening through the center thereof for receiving a riser 4 connected to a supply pipe 5 arranged in the base 2.

Revolubly mounted on the riser is a frame 6 for housing a suitable flat coiled spring 7. The spring has its inner end 8 secured to the pipe 4 in any suitable manner such as a set screw or bolt 9 and its outer end secured to the flange 10 of the frame 6. These connections are clearly shown in Fig. 3. A bolt or set screw 11 mounted in the lower end of the frame engages an annular groove 12 in the riser 4 to prevent vertical movement of the frame and to aid in assembling the machine.

The frame 6 has radially extending arms 13 connected at the top and bottom thereof to form a reel 13' for supporting the hose 14. This frame 6 is supported at its base by a journal 15 mounted on the plate. Suitable ball bearings 16 may be mounted between the journal and the frame to allow freer movement of the frame.

The plate 1 also supports a casing 17 which completely surrounds the rack by means of rollers 18 suitably connected to the casing to roll on the top of the plate. A spring 18' is interposed between the roller 18 and the lug 17' projecting inwardly from the casing to form a cushion for supporting the casing 17. When the gasket 23 becomes worn during the operation of the winder the casing will always tend to make a positive seal to prevent leakage around the washer. The spring 18 provides the necessary adjustability or take-up to resiliently support the casing and keep it in correct horizontal position as well as making an airtight joint about the gasket 23. Rollers 19 may be mounted on the side of the casing to engage the bottom of the plate to maintain the casing in position and to prevent lateral movement thereof.

The riser 4 has mounted thereon a member 20 for completing the air connection to the hose 14 as clearly shown in Fig. 2. This member 20 has its lower end reduced as at 21 to fit into an enlarged opening 22 in the riser. The bottom edge of the member rests upon a leather gasket 23 which is supported by the shoulders 24 formed by enlarging the opening in the pipe. The upper end of the member 20 has a U-shaped recess formed therein to receive a ball bearing 25 and the head of a bolt or screw 26 mounted in the top of the casing. The ball bearing provides easier rotation of the casing.

As part of the weight of the casing is supported by the riser there is a continual downward thrust upon the gasket which is disposed between the ends of the member 20 and the shoulder 24 and forms a tight seal between these two members, as shown in Fig. 6.

The member 20 has an arm 27 formed thereon to which the inner end of a pipe 26 is connected in any suitable manner such as by a union 27', the outer end of the pipe being connected to the hose 14. The arm 25 and the lower end of the member 20 is made hollow to form a passage 28 cooperating with the riser 4 and the pipe 26.

The casing 17 has an opening 29 in the side thereof through which the hose 14 extends. A ball race 30 is suitably mounted on the side of the casing and around the opening to allow the hose to more easily pass through the opening, thereby reducing wear at that point to a minimum.

The hose 14 may be provided with a rubber bumper 31 near the outer end thereof to prevent the end of the hose from being pulled inside the casing.

The machine may also be made to provide a combined air and water supply housed in a single casing as shown in Fig. 1. Where this double source of supply is housed in the one casing it has been found preferable to provide a pipe 40 extending upwardly through the base 2 in which an air line 41 and a water line 42 is arranged. A suitable T or member 43 is connected to the pipe 40 through which the water line 42 extends vertically therethrough. Connected to the member 43 is a pipe line 44 for encasing the air line 41 which is connected to the riser 4 arranged in the upper part of the casing 17 as clearly shown.

A reel 13' is mounted on the riser 4 in the same manner as previously mentioned. The only difference at this point is that the supply line is connected at the top instead of the bottom and the pipe line 26 inverted to save space. Otherwise, the construction and arrangement of the parts is the same as previously described.

The water line 42 extends upwardly through the plate 1 and has a frame 45 provided with radially extending arms 46 for receiving a spring 47 and a water hose 48 respectively. These parts being made and arranged in the exact same manner as the frame 6 and its cooperating parts, and attached to the riser 4 as hereinbefore explained.

The water line has a member 49 mounted on the upper end thereof to which a suitable pipe line 50 is connected to the water hose 48.

The upper end of the member 49 has a U-shaped recess 51 on which a lug 52 formed on the member 53 is received. A ball bearing 54 is disposed between the bottom of the recess and the lug for completing the same swivel connection previously described relative the member 20.

The member 53 is but a slight modification of the member 20 hereinbefore mentioned and described and this member is clearly shown in Fig. 1.

Connected to the T 43 is a flanged journal 55 and through which the water line extends. The plate 1 is mounted on this journal and rigidly secured thereto by suitable bolts 56. The casing 57 is in all respects the same as the casing 17 except it is made deeper and provided with two openings 29, therefore requiring two ball races 30, instead of one, and has an opening in the top of the casing to receive the air connection. This air connection also acts as a support for the casing which revolves about said pipe. The casing is mounted on the plate 1 and held in relative position by the rollers 18 and 19 as previously mentioned when describing the device shown in Fig. 2.

From the foregoing it will be seen that the combined water and air supply has two automatic hose winders which are operated independently and can be revolved about its vertical axis almost 360 degrees in either direction, as designated by the arrows in Fig. 3.

The double supply machine is incapable of revolving the full 360 degrees due to the line 44 extending upwardly which would contact with the hose. However, the machine revolves in either direction thereby allowing free access to the vehicle to be served regardless of where it may be positioned.

If desired a suitable stop (not shown) may be formed on or attached to the casing to engage some fixed part of the machine such as the plate to limit the movement of the casing although it has been found preferable in actual practice to allow free movement of the casing.

The winding element shown in Fig. 4 may be provided with lugs 60 formed on the sides of the casing 17 and in which is mounted a shaft 61. The upper end of this shaft extends through an opening 62 formed in the upper lug and has a gear 62 mounted thereon. A gear 63 mounted on the frame 6, meshes with the gear 62. A helical spring 64 is arranged on the shaft 61, the lower end of which is fastened to the shaft and has its upper end disposed in a hole 65 in the upper lug. In actual practice it has been found preferable to make the gears have a 4 to 1 ratio.

Instead of having lugs 60 extending from the side of the casing the gear 62 may have its shaft 61 extending through the bottom of the casing and housed in a housing 69'. The spring surrounds the shaft and has one end attached to shaft and the other end rigidly secured to the housing as clearly shown in Fig. 7.

By this arrangement a self winding machine is provided which will operate as will the flat springs shown in Figs. 1 and 2 and may be preferred thereover. Where the double supply is desired two such sets of gears and springs are provided or a combination of either.

Another modification of the winding device is shown in Fig. 5 in which a suitable pulley 70 is loosely mounted on a shaft 71 connected to the casing. The frame 6 is provided with a winding pulley 73 to receive a rope or cable 74 which passes over the pulley 70. The inner end of the member 74 is secured to the pulley 73 and the outer end connected to a suitable weight 75, thereby providing another method for operating the machine. It is plainly seen that when the hose is not in use it is wound around the frame 6 and supported by the arms 8, the weights causing the centrifugal action of the frame 6 on its axis, a double arrangement of these parts is provided for the double supply. It is understood of course, that a suitable passage is provided to receive the weight when the hose is unwound such as a vertical pipe positioned in the ground or the passage may consist of nothing more than a hole in the ground.

Where methods are employed to wind the reel other than the flat spring, the reel 13' may be slightly modified by making the same more compact as the additional space required to house this flat spring will not be needed. This arrangement is clearly shown in Figs. 4 and 5.

It is also understood that the hose lines are provided with suitable valves to control the air and water.

The machine may be provided with a suitable light 66 having a part thereof extending through the casing 17 and mounted on the riser 4. Flanges 67 and 68 may be formed on the light to clamp the light to the casing. Packing 69 may be placed between the flange 68 and the top of the cover to make a water-tight connection at this point.

In certain localities and especially in freezing weather means may be required to keep the water lines from freezing and the casing has been designed and space provided therein to receive a heater (not shown). This heater may be an electrical heater in some form, or an ordinary electric light globe may be used which in actual practice has been found sufficient to keep the lines from freezing.

To illustrate the advantages of the machine herein described the steps of operation will be discussed. It being assumed that a vehicle is in close vicinity of the machine and either air or water is required. The operator or attendant goes over to the machine and grasps the end of the hose projecting from the machine and goes towards the vehicle. As he goes towards the vehicle the hose machine swivels on its axis so that the opening through which the hose comes out faces that direction and unwinds by being pulled by the operator. The vehicle having been attended to the attendant releases the hose and it is automatically wound by the springs or weights revolving the frame and support within the casing. The springs or weights having sufficient force to completely wind the entire hose. It has been found, however, that not much tension is required on the springs as the hose when being pulled out winds the springs thereby adding more tension to the springs.

From the foregoing description it will be seen that a superior hose winding machine has been devised which is readily accessible and which was heretofore unknown in the art.

Instead of having the plate fixedly secured to the base it is also to be understood that the plate may be made to revolve around a vertical axis; the casing may be rigidly connected to the plate and revolve therewith or the casing may be disconnected and allow both the plate and casing to revolve independently.

Of course, various changes in form, construction and arrangement of parts may be made without departing from the spirit and without sacrificing any of the advantages of the invention and the right is hereby reserved to make all such changes as fairly fall with the scope of the following claims:

I claim:

1. An automatic winding machine comprising a plate connected to a suitable base, a pipe line extending upwardly through said base, a casing revolubly mounted on said plate and having an opening for the passage of a hose, a riser arranged within said casing and extending through said plate and connected to said pipe, a journal arranged on said plate, ball bearings arranged in said journal, a frame revolubly arranged around said riser and riding on said ball bearings, radially extending arms connected to said frame for supporting a hose, a rotatable member connecting said riser and said hose and a spring arranged in said frame for winding said hose on said arms.

2. A winding machine, comprising a revoluble casing having an opening for the passage of a hose, an axially-disposed support for said casing, a frame rotatable on said support, a spring secured to said support and to said frame for rotating said frame, a hose positioned to be coiled about said frame, and means extended outwardly from the frame and disposed within the casing to constitute a reel for said hose.

3. An automatic winding machine comprising a plate, an upwardly-extending pipe line, a casing revoluble relatively to said plate and having an opening for the passage of a hose, a riser within said casing and connected to said pipe line, a journal bearing, a hose reel revoluble on said bearing and arranged around said riser, a hose extending through the opening in the casing and adapted to be wound upon the reel, a member rotatable with said reel and connecting said riser and said hose, and a spring arranged within the hose reel and acting on the reel for winding the hose upon the reel.

4. An automatic winding machine comprising a plate connected to a suitable base, a pipe line extending upwardly through said base, a casing revolubly mounted on said plate and having an opening for the passage of a hose, a riser within the casing extending above the plate and connected to said pipe, a bearing on said plate, a hose reel journaled on said bearing and arranged around said riser, a hose adapted to be wound upon the reel, a rotatable member connecting said riser and hose, and a spring arranged in said hose reel and connected to the reel for winding said hose thereon.

5. An automatic winding machine comprising a revoluble casing having an opening for the passage of a hose, a support for the rim of said casing, a pipe line extending to the casing-supporting means, a riser within the casing connected to said pipe line, a hose reel, means for revolubly mounting the reel about said riser, a spring connected with said riser and with the hose reel, and a ball bearing for the casing on said riser.

6. An automatic winding machine comprising a plate suitably mounted, a casing revolubly supported on the plate and having an opening for the passage of a hose, a pipe in said casing, a hose supporting reel surrounding the pipe and rotatable thereon, a spring intermediate of and connected with the pipe and said hose-supporting reel, and means for axially supporting the casing on said pipe.

7. An automatic winding machine comprising a casing having an opening for the passage of a hose, a hose reel within the casing and having a frame, a spring within the frame, a riser in said casing to which one end of the spring is connected, the other end being connected to the frame, means revolubly supporting the casing on said riser, a support for the riser and means revolubly supporting the casing on said support.

8. An automatic winding machine comprising a plate, an upwardly extending pipe line, a casing revoluble relatively to said plate and having an opening for the passage of a hose, a riser within said casing connected to said pipe, a journal bearing, a hose reel on said bearing and arranged around said riser, a hose extending through the opening in the casing and adapted to be wound upon the reel, a member rotatable with said reel and connecting said riser and said hose, and means connected to said reel for rotating the wheel to wind the hose thereupon.

9. A winding machine comprising a casing having openings for the passage of hoses, a pair of reels in said casing positioned in vertical axial alignment, a hose for each reel extending through an opening in the casing, shaft members for the reels having passages therein and arranged in axial alignment, a connecting member for each reel rotatable with the reel and having a passage connecting the passage in the shaft member with the hose on the reel, a bearing between said connecting members, and means for rotating the reels independently to wind their respective hoses thereon.

ALRAH B. EDWARDS.